United States Patent

Lanza et al.

[11] 4,126,783
[45] Nov. 21, 1978

[54] RADIATION IMAGING SYSTEM

[75] Inventors: Richard C. Lanza; A. Robert Sohval, both of Cambridge, Mass.

[73] Assignee: Butler-Newton, Inc., Newton, Mass.

[21] Appl. No.: 800,411

[22] Filed: May 25, 1977

[51] Int. Cl.$^2$ .............................................. G017 1/00
[52] U.S. Cl. ............................. 250/336; 250/363 S; 250/394
[58] Field of Search ................... 250/336, 363 S, 370, 250/371, 393, 394, 395, 526

[56] References Cited

U.S. PATENT DOCUMENTS 4,037,102  7/1977  Hoyle et al. ................. 250/370 X Primary Examiner—Davis L. Willis
Attorney, Agent, or Firm—Cesari and McKenna

[57] ABSTRACT

A radiation imaging system employs a super-heated, super-conducting colloid detector subjected to an external magnetic field such that all the colloid grains are maintained in the metastable super-conducting state in the absence of radiation. Imbedded in the detector are intersecting helical sensing coils that divide the detector into volumetric resolution elements. The grains in each element that absorb x-ray or gamma ray photons emanating from an object make a transition to the normal conducting state thereby producing flux changes in the vicinities of the grains which induce signals in the coils defining the resolution element in which those grains are located. The number of signals from each element are accumulated separately and used to produce an image of the object.

10 Claims, 3 Drawing Figures

RADIATION IMAGING SYSTEM

BACKGROUND OF THE INVENTION

This invention relates to x-ray imaging apparatus. It relates especially to a detector for detecting x-ray or gamma ray photons that have been emitted from a human organ or other object to produce an indication of the composition of that organ or object. For example, in nuclear medicine applications a radioactive tracer may be placed in a fluid that tends to accumulate in a certain organ in the body. By detecting photons emitted by the radioactive material for a certain period of time, an image of that organ may be obtained, which image may show irregularities or abnormalities in that organ.

In some cases the detector used in such imaging apparatus is simply a sheet of film that is sensitive to incident radiation, with the area of the film being commensurate with the size of the organ or other object being examined.

Film-type detectors, however, have certain drawbacks. In the first place, the radiation sensitive grains in the film (e.g. photosensitive silver compounds) are not very dense. Therefore they are not very efficient as photon absorbers. Therefore the organ or other object must be exposed to radiation for a relatively long period in order to develop a reasonably good image.

Also, for best results in terms of image sharpness and clarity, it is desirable that the radiation to which the organ or object is exposed be mono-energetic and that the individual photons travel in straight lines from the source through the organ to the detector. However, as a practical matter, some of the photons are scattered as they pass through the organ. Consequently, when these photons reach the detector they appear to the detector as having originated at different points in the organ. In other words, the detector does not discriminate between scattered photons and those which have not been scattered by the organ or object. This results in blurring and loss of definition in the image on the film. Further, a film must be developed before the image is available thereby delaying diagnosis and, of course, the film is not reusable and requires mounting fixtures to properly support it in a planar state.

Recently there has been developed a radiation detector employing a so-called super-heated, super-conducting colloid (SSC). Basically, the detector comprises a colloid body composed of small grains of a dense superconducting material suspended in a less dense binder. The body is subjected to a low temperature and an external magnetic field that maintain the grains in a metastable super-conducting state in the absence of radiation. When a grain is impacted by a photon, it undergoes a transition from the metastable super-conducting state to the normal conducting state. This transition produces a magnetic flux change in the region of the grain and the flux change is detected by a sensing coil on the surface of the body that has at least one loop encircling the grain in question. As each grain within that loop changes to its normal conducting state in response to an incident photon, a voltage pulse is developed in the sensing coil reflecting that change. Consequently the number of pulses detected provides an indication of the intensity of the radiation incident on the detector. See French Pat. application No. 7536494.

Until now, however, the so-called SSC detectors have had relatively low quantum detection efficiency and very small cross sectional area. Therefore they have not seen applications in radiology and nuclear medicine. The inefficiency stems from the fact that the usual SSC detector is relatively thin (e.g. 1 mm). Therefore a relatively high percentage of the incident photons do not have an opportunity to interact with, and be absorbed by, the colloid grains in the detector. It is no solution to increase the thickness of the usual SSC detector because a sensing coil in the detector having a width W responds to flux changes produced only by those grains which reside within a distance of approximately $W/2$ above or below the plane of the coil. Therefore a sensing coil on the surface of the typical colloid body does not detect photon interactions with grains near the center of the body. Likewise, a coil imbedded in the body may not detect events occurring near the surfaces of the body. Thus even though more photons may interact with the detector grains, many of these interactions would not be detected by the sensing coil so that there would be no net gain in detection efficiency. Thus, in order to obtain an image of the object being irradiated, with the usual SSC detectors, a relatively long period of exposure is still required, presenting a potential health hazard in the case of animals and humans.

SUMMARY OF THE INVENTION

Accordingly, the present invention aims to provide a large area radiation imaging system which is able to produce high quality images of relatively large organs and objects in a minimum amount of time.

A further object of the invention is to provide a large area detector for such a system which detects a maximum number of incident photons.

A further object of the invention is to provide a detector of this type which can discriminate between unscattered and previously scattered incident photons.

Still another object of the invention is to provide a large area detector that has relatively good spatial resolution.

Yet another object of the invention is to provide a radiation detector which, unlike a film, can be erased and reused.

Another object is to provide a photon detector having a high event rate capability, which reduces the required exposure time thereby permitting high quality images to be acquired of dynamic organs such as the heart.

A further object of the invention is to provide a radiation detector which may be read out electronically and connected to a computer for further processing.

Other objects will, in part, be obvious and will, in part, appear hereinafter.

The invention accordingly comprises the features of construction, combination of elements and arrangement of parts as exemplified in the following detailed description, and the scope of the invention will be indicated in the claims.

In general, our imaging system includes a radiation detector in the form of an SSC body subjected to the temperature of liquid helium and to an external magnetic field that maintain the colloid grains in a metastable super-conducting state in the absence of radiation. The surface area of the SSC body illuminated by incident radiation is relatively large and the SSC body is thick or high enough so that substantially all of the incident photons upon entering the SSC body are absorbed by one or another of its grains. Imbedded in the SSC body are intersecting, narrow elongated sets of sensing coils that divide the body along its length and width into a multiplicity of resolution elements. Furthermore, each coil in the sets is a multiturn helix that extends substantially the full height or thickness of the body so that the coils in one set are interlaced with the coils in the other set. Resultantly, each resolution element is a volume extending the height of the body and bounded by a pair of sensing coils, one from each set of coils and filled with colloid grains. The number of turns in, and pitch of, each sensing coil are such that each of the colloid grains in each volumetric resolution element is within a distance of W/2 from the plane of a coil turn belonging to each coil set.

When a photon enters the detector body, it interacts with, and is absorbed by, a colloid grain located in one of the detector's resolution elements. The energy transferred to that grain raises its temperature above the critical temperature above which the grain can no longer remain superconducting. Resultantly the grain makes a quick ($10^{-7}$ sec) transition to the normal conducting state producing a change in the grain's dipole moment and thus a flux change in the vicinity of the grain. This change in magnetic flux induces voltage pulses in the sensing coils closest to the impacted grain, which are strongest in the two coils defining the resolution element in which that grain is located. A set of coincident circuits to which the coils of each set are connected responds to the coincident pulses. Thus the output of these circuits identifies the resolution element in which the photon interaction event took place.

In a typical system, the voltage pulses from each coil are applied by way of a comparator amplifier that provides a noise threshold to a random access memory of a computer. The computer memory is arranged with a memory location corresponding to each resolution element in the detector body. Each memory location contains a word representing the current number of events that have occurred in the resolution element corresponding into that memory location.

Upon the occurrence of an event in a given resolution element, the memory location for that resolution element is addressed and the word read from memory into a counter where it is incremented by one and then read back into that same memory location. Thus over the exposure period, each memory location contains a number corresponding to the number of photon interactions that occurred in the corresponding resolution element of the detector during that period. Consequently that number reflects the intensity of the radiation incident upon that resolution element. Thus if the radiation illuminates the detector after passing through a human organ or other object, the data in the memory will reflect the amount of radiation absorbed by different-density portions of that organ or object. Consequently the information can be used to produce an x-ray or gamma ray image of that organ or object.

The provision of intersecting sets of interlaced multi-turn helical sensing coils that extend substantially the full thickness of the detector ensures that substantially all of the incident photons will be detected no matter where they interact with the detector's colloid grains. Consequently the detector can be made quite thick without any loss efficiency so that it will stop or absorb a very large percentage (e.g. 95% or more) of the incident photons. This, in turn, means that a suitable image can be obtained while keeping to a minimum the dosage to which the organ or object is subjected.

Since the grain transition occurs in a short time (about $10^{-7}$ second), the detector can operate at very high x-ray or gamma ray fluxes, e.g. greater than $10^{-6}$ events/sec. This high rate capability significantly exceeds the rates achievable by conventional nuclear medicine detectors.

In order to cause a transition of a particular grain in the detector from its super-conducting to its normal state, the incident radiation must have a certain threshold energy. This energy threshold depends upon the size of the grain and the external magnetic field to which the detector is subjected. Thus by varying the magnetic field, the detector can be made responsive only to incident radiation above a selected energy level. In many applications, the radiation source produces photons which are mono-energetic and travel in straight lines. When these photons pass through an organ or object, some of them are scattered and thus lose some of their energy before they interact with the colloid grains in the detector. Therefore, the position in the detector of the event produced by each of these scattered photons does not correspond to the initial path of the photon through the object being examined. This phenomenon results in blurring and loss of clarity in the resultant x-ray image. The present system includes provision for adjusting the external field applied to the colloid body that enables it to discriminate between the lower energy photons that were scattered previously and the unscattered photons of higher energy. By proper selection of the field strength, the grains in the detector can be made non-responsive to the lower energy photons.

By the same token, after a particular object has been examined, the system can be "erased" in that all of the grains in the detector can be returned to their metastable superconducting state by momentarily turning off the magnetic field or reducing it below the critical value.

Thus the present system produces superior x-ray or gamma ray images that are characterized by their clarity and high spacial resolution. Furthermore, the detector has high quantum detection efficiency because it utilizes a thick body composed of high density grains that absorb almost all of the incident photons and detects substantially all of these events no matter where they occur in the body. Consequently a satisfactory image can be produced with a relatively small radiation dosage. Furthermore, the detector can operate at very high x-ray or gamma ray fluxes, thus providing high quality images of dynamic organs such as the heart.

BRIEF DESCRIPTION OF THE DRAWINGS

For a fuller understanding of the nature and objects of the invention, reference should be had to the following detailed description taken in connection with the accompanying drawings in which.

DESCRIPTION OF THE PREFERRED EMBODIMENT

Figure 1:
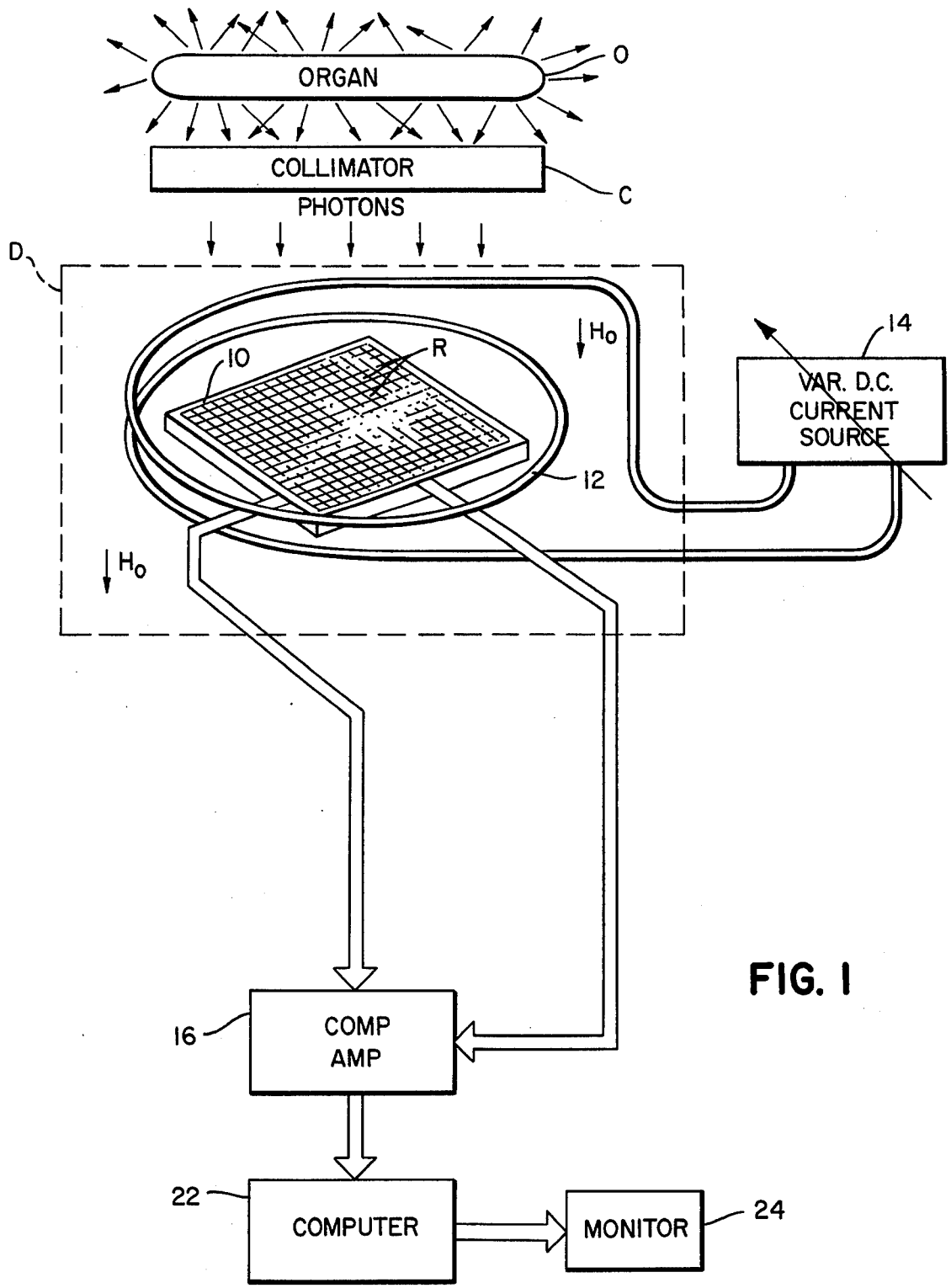
FIG. 1 is a block diagram of a radiation imaging system made in accordance with this invention.

Referring to FIG. 1 of the drawings, our system comprises a detector indicated generally at 10 which is maintained at the temperature of liquid helium in a cryostat shown in dotted lines at D. Further, the entire detector volume is subjected to a magnetic field $H_0$ of several hundred gauss produced by a coil 12 encircling the detector with the current through the coil being supplied by a variable current source 14. In the FIG. 1 embodiment, the detector has the form of a large-area body with the field $H_0$ being perpendicular to the general plane of the body.

The illustrated system is being used to detect gamma rays emanating from a human organ O, the photons being produced, for example, by a radioactive fluid that is concentrated in organ O. The photons are mono-energetic and tend to travel in straight lines toward detector 10 unless they are absorbed or scattered by the bone, tissue, fluid, cartilage, etc. in organ O, the amount of absorption being dependent upon the densities of these components and the amount of radioactive material at a given point in organ O being dependent on the nature of the radioactive material and the physiology of the organ. Photons that are not absorbed by organ O travel in straight lines toward detector 10 whose opposing area is at least as large as the cross-sectional area of organ O. There may also be a collimator C in front of the detector to form an image of the emitted gamma or x-rays as is usually employed in conventional imaging devices. The collimator may be a single or multihole collimator or may be of some other configuration such as a Fresnel lens or other such "coded aperture." It may also be variable in time. These photons interact with detector 10 at different resolution elements R in the detector depending upon the points in the organ from which those photons originated. Furthermore, the number of interactions in each resolution element R in the detector reflects the intensity of the radiation at a particular location in the organ and thus the tissure properties at these points such as in the usual techniques of nuclear medicine.

Upon the occurrence of each interaction event, detector 10 produces output signals reflecting the location or identity of the resolution element R in which that particular event took place. Tnse signals are applied to a set of comparator amplifiers 16 and those signals that exceed a certain threshold level are stored in the memory of a conventional computer 22. The computer memory is a random access memory that has a memory location corresponding to each resolution element R in detector 10. Each memory location contains a word reflecting the current number of events that have occurred at the corresponding resolution element R.

Each time an event occurs in a particular resolution element, the memory location corresponding to that resolution element is addressed and the word at that location is read into a counter where it is incremented by one. Then the updated word is written back into the same memory location. Thus the computer memory as a whole contains the number of events that have occurred in each resolution element in detector 10, which numbers represent the intensities of the radiation incident on all the resolution elements. That information is stored in computer 22 until needed and may be used to control a monitor 24 to display an image of the organ O.

Figure 2:
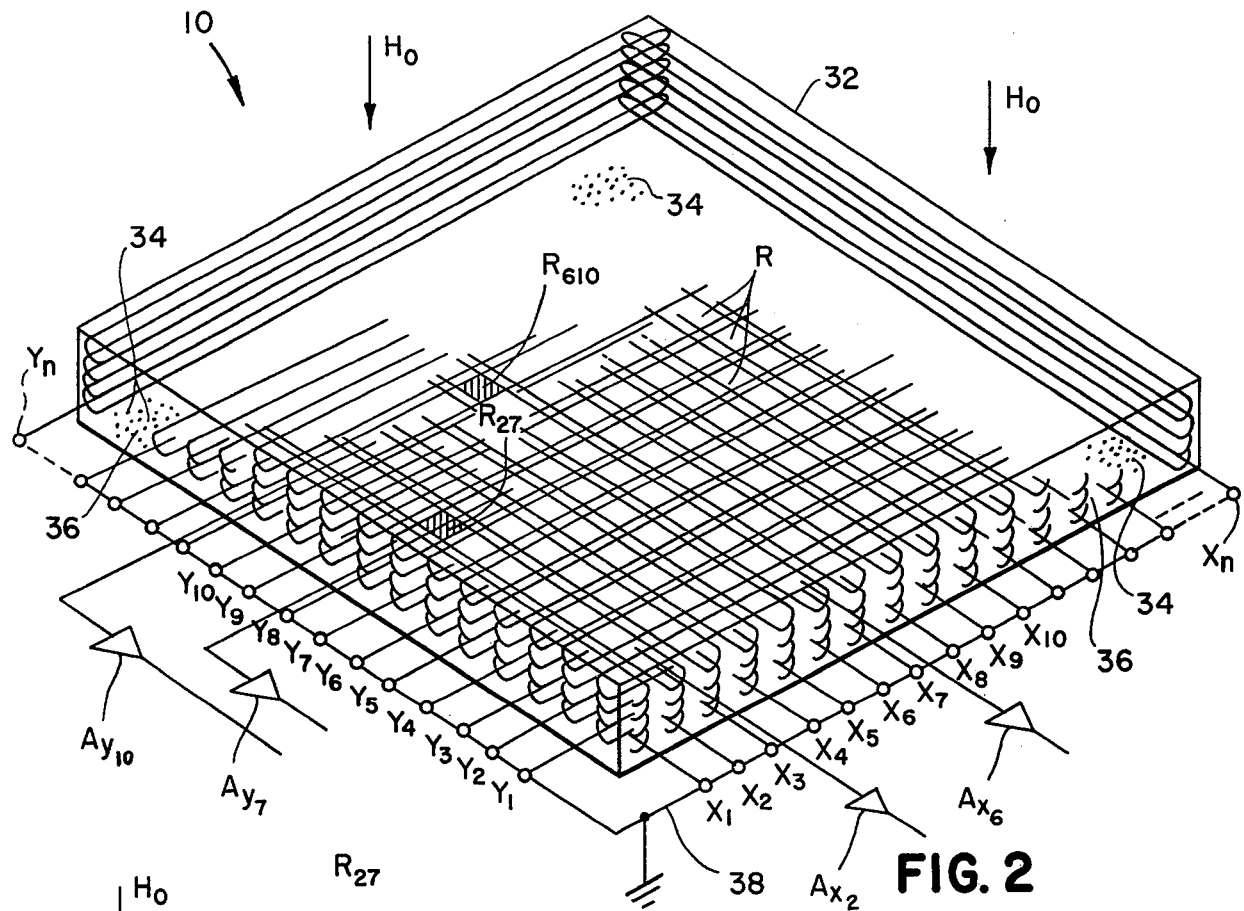
FIG. 2 is a diagrammatic view of a large area radiation detector used in the FIG. 1 system.

Turning now to FIG. 2, the illustrated detector 10 comprises a generally rectangular slab 32 which presents an appreciable area to the radiation emanating from organ O. In a typical embodiment, the detector is on the order of 40cm long (i.e. the X direction) and 40cm wide (i.e. the Y direction). The thickness of slab 32 (i.e the Z direction) is selected to be large enough so that the slab stops or absorbs a large percentage (e.g. 95% or more) of the photons incident on the slab. A typical slab 32 may be on the order of 3 to 5mm thick.

The slab 32 is a so-called super-heated, super-conducting colloid (SSC) composed of a multiplicity of grains 34 of a super-conducting material having a high atomic number, such as tin or lead suspended in a binder material 36 having a low atomic number, such as epoxy resin or other plastic material. Typical grain sizes are of the order of tens of microns and approximately 30% to 50% of the volume of slab 32 is composed of such grains.

Imbedded in slab 32 are orthogonal, interlaced sets of long, narrow helical sensing coils. The coils of one set are uniformly spaced along the length (X axis) of the slab. These coils are designated $X_1, X_2, X_3 \ldots X_n$. Each of these coils extends the full width (Y axis) of the slab and is composed of several turns that wind through substantially the entire thickness (Z axis) of the slab. The other set of coils designated $Y_1, Y_2, Y_3 \ldots Y_n$ is distributed in the same way along the width of the slab, with each coil extending the full length of the slab. Each of these coils is also composed of several turns that wind back and forth throughout substantially the full thickness of the slab.

Thus a pair of coils, one from each set, uniquely defines each resolution element R in the detector. For example, the shaded resolution element $R_{27}$ in FIG. 2 is defined by sensing coils $X_2$ and $Y_7$. Likewise, the shaded resolution element $R_{610}$ is defined by sensing coils $X_6$ and $Y_{10}$.

In a typical detector embodiment, each coil has a width W on the order of 1.0mm, is spaced from its neighbors a distance of 2W (i.e. 2mm) and the number of turns in each coil is selected so that no grain 34 is further away from the plane of a coil turn from each set than ½ the coil width W, i.e. 0.5mm. Thus in a detector comprising a slab 32 that is 5 millimeters thick, each coil $X_n$, $Y_n$ should consist of 6 turns and have a pitch of 1mm.

Still referring to FIG. 2, one end of each coil $X_n$, $Y_n$ is connected to ground by way of an electrical lead 38. The other end of each coil $X_n$, $Y_n$ is connected to the input of a separate comparator amplifier $A_{x1}, A_{x2}, \ldots A_{xn}; A_{y1}, A_{y2}, \ldots A_{yn}$ comprising the set of amplifiers 16 (FIG. 1). As mentioned previously, the entire detector 10 is maintained at a very low temperature and is subjected to an external field $H_0$ that extends in the thickness or Z direction as indicated in FIG. 2.

Figure 3:
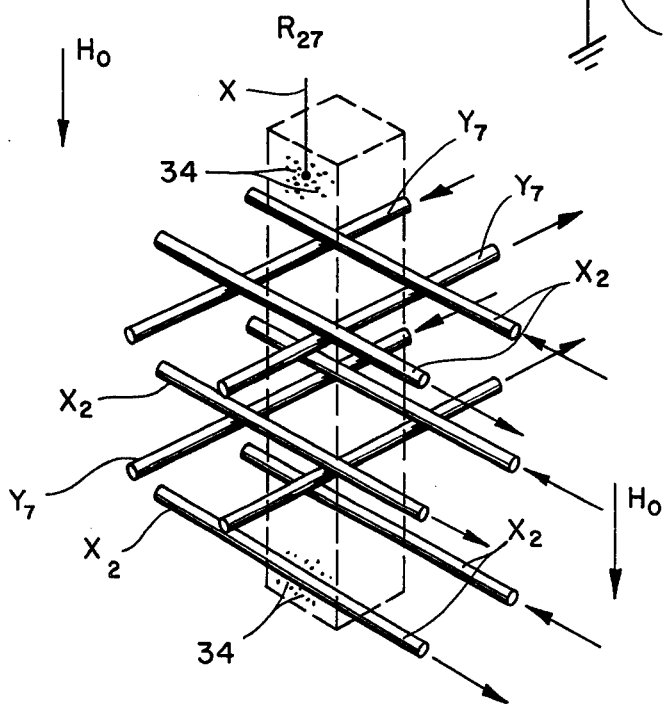
FIG. 3 is a fragmentary diagrammatic view of the FIG. 2 detector on a much larger scale further illustrating the operation of the detector.

Turn now to FIG. 3 which shows resolution element $R_{27}$ defined by the interlaced helical sensing coils $X_2$ and $Y_7$. It is apparent that this resolution element, as well as all others, is in the form of a rectangular parallelepiped that extends substantially the full height or thickness of slab 32, even though only a few of the coil turns have been shown in that figure for ease of illustration. Resolution element $R_{27}$ contains a multiplicity of superconducting grains 34 distributed throughout its volume. However, because of the helical configuration of the coils $X_2$ and $X_7$, no grain is more than one-half the coil width W away from the plane of one of the turns in each of the coils $X_2$ and $X_7$.

A photon X entering the detector 10 at resolution element $R_{27}$ normally interacts with a super-conducting grain somewhere in the volume of that resolution element since the thickness of the detector is such that 95% or more of the incident photons are absorbed by the grains. That photon transfers its energy to the impacted grain in a time that is short compared with the thermal relaxation time of the grain. Consequently the temperature of the grain rises by an amount depending upon the incident photon energy and the grain size. Since at low temperatures, the specific heat of the grain is extremely small, the temperature rise is large enough to raise the temperature of the grain above the critical temperature above which it can no longer remain superconducting. Resultantly, the grain makes a quick (e.g. 100 nanosecond) transition or "flip" to the normal conducting state.

This process may be likened somewhat to the photographic process in which any photon above some minimum energy level which strikes a film grain causes the entire grain to change.

As is known, grains in the super-conducting state are perfectly diamagnetic. That is, the external magnetic field $H_0$ is excluded from the grain interior because of the Meissner effect. However when a grain makes a transition to the normal state, its dipole moment decays in a characteristic time of a few hundred nanoseconds permitting the external field $H_0$ to penetrate the grain. This change in permeability produces a flux change in the vicinity of the grain that induces voltage pulses in the sensing coils nearest that grain, i.e. coils $X_2$ and $Y_7$. It can be shown that the voltage induced in a long, narrow sensing coil of width W from a grain transition at its center may be expressed as follows:

$$V = \frac{2}{\pi} \frac{1}{c} \frac{r_g}{W} \frac{H_0}{\sigma} \qquad \text{Equation 1}$$

where:
V = the induced voltage
c = the velocity of light
$r_g$ = grain radius
W = coil width
$H_0$ = applied field
$\sigma$ = grain conductivity in the normal state In the case of the present detector which operates in an event by event mode, when single grain transitions or "flips" are detected, the induced voltage in the pair of coils is about six microvolts. In the present example, the worst case signal of interest corresponds to a grain located outside a given sensing coil at a distance of 1.5W or 1.5mm from its center. The induced voltage in this worst-case example is about 0.8 microvolts which corresponds to 30,000 electrons which is readily detected with commercially available, low cost, low noise amplifiers.

The coincidence of the voltage pulses induced in coils $X_2$, $Y_7$ in the present example is sensed and used to address the corresponding location in the computer memory 22 (FIG. 1) where that event caused by photon X is recorded as described above.

It is important to understand that a long, narrow sensing coil of width W will effectively respond to the transitions of only those grains which are situated within a distance of approximately W/2 above or below the plane of the sensing coil. Thus, for example, an array of 1mm wide sensing coils on the surface of a 5mm thick slab 32 will not respond to the majority of grain transitions in the colloid slab.

However in the present system each sensing coil comprises several turns extending the full thickness of the slab 32 so that each grain in the slab is situated within a distance of W/2 of the appropriate pair of sensing coils.

Further, the ratio of the mutual inductance of two orthogonal coils $X_n$ and $Y_n$ to the self-inductance of each of these coils is small (about $4 \times 10^{-6}$) indicating that these coils are effectively decoupled. Also the ratio of mutual-to-self-inductance for adjacent parallel coils $X_1, X_2, \ldots X_n$ or $Y_1, Y_2, \ldots Y_n$ is small and decreases as the inverse square of the distance separating the coils. Therefore the portion of the slab 32 volume to which each helical sensing coil responds is geometrically well defined.

In the case of the present detector, the photon threshold energy depends upon the grain size and the external magnetic field $H_0$. Thus for a given grain size, by varying the magnetic field strength $H_0$, the threshold energy can be varied accordingly. In fact, it has been demonstrated that the region of energies between no grains undergoing transition and essentially all grains undergoing transition may be controlled to within 5% of the threshold energy. Consequently by properly adjusting source 14, the field $H_0$ can be set so that the mono-energetic unscattered photons are able to "flip" the colloid grains 34, while the lower energy photons that have been scattered by organ O (FIG. 1) are not able to do so thus minimizing blurring of the resultant image caused by events due to such scattered photons.

In some cases, a grain transition to the normal conducting state may induce voltages in more than one sensing coil in each set. Thus in the present example, in addition to inducing voltages in coils $X_2$ and $Y_7$, the incident photon X may provoke smaller sensed signals in the adjacent coils $X_3$ and $Y_8$. In this event, conventional analog or digital interpolation schemes may be used to find the center of that group or cluster of coils that responded to the single event and thus properly locate the resolution element in which the event actually occurred. One suitable interpolation scheme using digital techniques is disclosed in an article entitled, "Two-dimensional Proportional Chamber Readout Using Digital Techniques" published in the IEEE Transactions on Nuclear Science, Vol. NS-23, No. 1, February, 1976. An appropriate analog interpolation scheme is disclosed in an article entitled "The Spherical Drift Chamber for X-ray Imaging Applications" that appeared in CERN Report 73-11 and in Nuclear Instrument and Methods, Vol. 122, pgs. 207–312, 1974.

It will be seen from the foregoing then that the present system can provide large area x-ray or gamma ray images of human organs or other objects. The system employs a rigid detector that does not require special mountings to maintain it in a substantially planar state. Furthermore, the detector comprises a relatively thick colloid body consisting of dense grains which absorbs substantially all incident photons. At the same time, the detector senses all of the events due to the incident photons throughout its entire volume so that its quantum detection efficiency is quite high. Finally, by properly adjusting the external magnetic field to which the detector 10 is subjected, the system can be made nonresponsive to incident photons that have been scattered upon passing through the object being examined and by momentarily removing the field, the entire detector can be erased so that a new image can be produced.

It will thus be seen that the objects set forth above, among those made apparent from the preceding description, are efficiently attained and since certain changes may be made in the above construction without departing from the scope of the invention. For example, instead of using helical sensing coils, stacks of separate coils would be feasible, there being one coil corresponding to each turn of the helical coils. Then the output of each vertical stack of coils would be OR'd together ahead of the coincidence detector. Therefore, it is intended that all matter contained in the above description or shown in the accompanying drawings be interpreted as illustrative and not in a limiting sense.

It is also to be understood that the following claims are intended to cover all of the generic and specific features of the invention herein described.

We claim:

1. A radiation imaging system comprising
   A. a colloid body composed of small grains of a dense super-conducting material suspended in a binder, said body being positioned for exposure to photons incident from a selected general direction,
   B. a cryostat for maintaining the temperature of the grains below the critical value at which they can become super-conducting,
   C. means for applying an external magnetic field to the body so as to maintain the grains in a metastable super-conducting state in the absence of radiation,
   D. a first set of sensing coils spaced apart in one direction through said body other than said selected general direction,
   E. a second similar set of sensing coils spaced apart in a second direction through said body other than said first and said selected general directions, said second set of coils intersecting the first set of coils, each said set of coils having coil turns stacked in said selected general direction whereby the turns of coil pairs, one pair from each set, define unique volumetric resolution elements in the body so that when an incident photon interacts with a colloid grain, the grain undergoes a transition to its normal conducting state producing a flux change in the vicinity of the grain which induces coincident signals in the coil pair defining the resolution element in which the transition took place.

2. The system defined in claim 1 and further including means responsive to the signals from the coil pairs for indicating the number of photon interactions occurring in each said resolution element.

3. The system defined in claim 2 wherein the responsive means include means for detecting coincident signals in coil pairs from the first and second coil sets.

4. The system defined in claim 3 wherein the responsive means include means for interpolating the position of detected event from the coincident signals.

5. The system defined in claim 3 wherein the responsive means also include means for storing at separate memory locations the number of coincident signals detected for each coil pair.

6. The system defined in claim 1 and further including means for varying the external magnetic field to which the body is subjected so as to make the sytem nonresponsive to incident photons below a selected energy level.

7. The system defined in claim 1 wherein said body is a slab having very large extents in the first and second directions and whose extent in the selected general direction is sufficient to enable the slab to stop a high percentage of the incident photons.

8. The system defined in claim 7 wherein
   A. the coils in one set comprise long, narrow helical coils
      (1) imbedded in the slab,
      (2) spaced along the slab length, and
      (3) extending the width of the slab
   B. the coils in the other set comprise long, narrow helical coils
      (1) imbedded in the slab,
      (2) spaced along the slab width, and
      (3) extending the length of the slab
   so that the coil in one set intersect and are interlaced with the coils in the other set thereby dividing the slab into resolution elements in the form of rectangular parallelepipeds extending substantially the full thickness of the slab.

9. The system defined in claim 1 wherein at least one coil in each set is a helix whose turns are stacked in the selected general direction.

10. The system defined in claim 9 wherein each coil in each said coil set comprises a multiturn helix extending the full thickness of the body.

* * * * *